Feb. 20, 1940.                F. HUMPHREYS                2,190,790
                       BORE-HOLE SURVEYING INSTRUMENT
                           Filed June 3, 1936
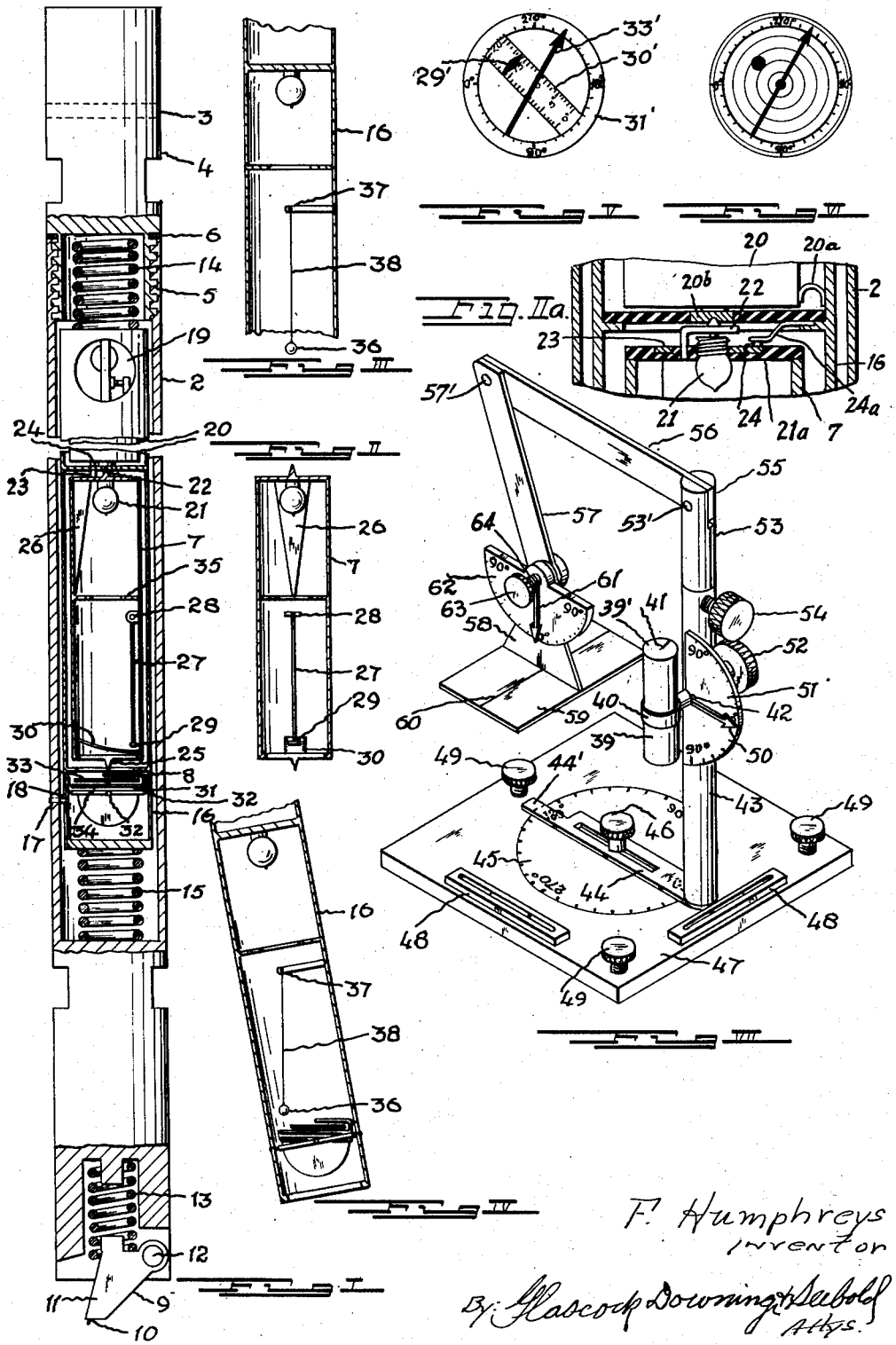
F. Humphreys
Inventor
By Glascock Downing & Seebold
Attys.

Patented Feb. 20, 1940

2,190,790

UNITED STATES PATENT OFFICE 2,190,790

BORE-HOLE SURVEYING INSTRUMENT

Frank Humphreys, Klerksdorp, Transvaal, Union of South Africa

Application June 3, 1936, Serial No. 83,387
In the Union of South Africa September 12, 1935

12 Claims. (Cl. 255—1)

The present invention relates to bore-hole surveying instruments for use in determining the dip and strike of strata existing underground. The dip of a stratum is the angle between the plane of the stratum and a horizontal plane, whilst the strike of the stratum is the angle which a vertical plane passing through the intersection of the plane of the stratum and a horizontal plane makes with a vertical plane passing through the north.

In order to ascertain the dip and strike of strata existing underground it is first of all necessary to sink a bore hole to intersect the stratum to be investigated and to extract a piece of bore-core from the lower end of the bore hole. A bore hole of any considerable depth, however, always deviates from its original vertical direction so that readings taken from the piece of bore-core when mounted in a vertical position will not correctly represent the dip and strike of the selected stratum. To interpret the bore-core correctly it is necessary to obtain a record of the inclination and magnetic bearing of the lower end of the bore hole at the depth of the selected stratum. The inclination of the bore hole is the angle which the axis of the bore hole at the depth in question makes with a vertical line in the vertical plane containing said axis, and the magnetic bearing of the bore hole is the angle which the vertical plane through the axis of the bore hole at the depth in question makes with a vertical plane passing through the magnetic north.

An object of the invention is to provide a bore-hole surveying instrument capable of recording the inclination and the magnetic bearing of the lower end of the bore hole. It is also an object of the invention to mark a piece of bore-core at the bottom of the bore hole with a mark which has a known relationship to the data recorded by the surveying instrument.

The series of operations may be summarized as follows. A bore hole is drilled to the desired depth, the surface at the bottom of the bore hole is ground until it is a flat plane perpendicular to the axis of the lower end of the bore hole, and all accumulated sand or silt is then removed from the bottom of the bore hole by any suitable flushing device. A bore-hole surveying instrument is lowered to the bottom of the bore hole and a mark is made on the flat surface at the bottom of the bore hole by means of a resiliently yielding finger which is caused to scratch a line on said surface by slightly raising and lowering the instrument. After an interval determined by a timing device inside the instrument, a photographic record is made of the position of the devices in the instrument indicating the inclination and magnetic bearing of the bore hole. The bore-hole surveying instrument is then removed and drilling of the bore hole is continued so as to form a stump of core carrying the marked surface, and said stump is broken off and extracted from the hole. It is then mounted in a goniometric device provided with adjustments whereby, by making use of the photographic record, the bore-core may be set in a position which corresponds in all respects with the position that it originally occupied when in situ in the bore hole. The dip and strike of any selected stratum in the piece of bore-core may then be read off by further devices on the goniometric device.

A description will now be given, by way of example only, of arrangements for carrying the process into effect, reference being made to the accompanying drawing comprising Figures I—VII.

Figure I is a longitudinal section of one form of bore-hole surveying instrument.

Figure II is a longitudinal section of the clinometer cage in the arrangement of Figure I taken at right angles to the section of Figure I.

Figure IIa is a detail view of portion of Figure I.

Figure III is a section of a modified form of clinometer making use of a plumb-bob without a revolving cage.

Figure IV shows more detail of the arrangement of Figure III in an inclined position such as it would occupy at the bottom of the bore hole.

Figure V shows the record produced by the instrument of Figure I.

Figure VI shows the record produced by an instrument similar to that of Figure I but provided with the modified form of clinometer shown in Figures III and IV.

Figure VII is a perspective view of a goniometric device.

Referring to Figure I, 2 indicates a cylindrical outer metal casing of one form of bore-hole surveying instrument. A cap 4 screws into the cylindrical casing 2 by means of the screw thread 5, the surface of separation between members 4 and 2 being sealed by means of a lead washer 6. The cap 4 is provided with a hole 3 for attachment to a rope whereby it may be lowered to the bottom of a bore hole which has reached a depth at which it is to be surveyed. In the casing 2 is a clinometer cage 7 and a compass 8, which, in conjunction, serve to provide records indicative of the inclination and magnetic bearing of the axis of the lowermost portion of the bore hole, whilst at the lower end of the instrument is a marking device 9 for making a mark on the surface of the rock at the bottom of the bore hole.

The marking device consists of a diamond 10 which is secured to the lower end of a steel finger 11 pivoted at 12 and actuated downwards by a helical spring 13. When the instrument is lowered to the bottom of the bore hole the spring 13 is compressed and the finger 11 moves upwards so that owing to the position of the pivot the diamond 10 moves radially outwards from its normal position towards the periphery of the bore hole, thereby producing a deep radial scratch mark over the flat surface which has been ground at the bottom of the bore hole at right angles to the axis of the lower end of the bore hole. For soft rocks a steel scriber may be used or alternatively use may be made of two centre punches assembled in a holder; one punches a centre mark and the other a mark towards the periphery. The instrument is preferably raised from and lowered onto the surface at the bottom of the bore hole three or four times to ensure a well scratched mark at the surface of the rock. A stethoscope attached to the top of the rope is found extremely useful in hearing the actual contact of the diamond point.

The apparatus in the casing 2 is carried between compression springs 14 and 15 to prevent shocks damaging the apparatus. This apparatus is mounted inside an inner casing 16 which is prevented from rotating with respect to the outer casing 2 by means of a pin 17 on the outer casing which engages a longitudinal groove 18 on the inner casing. The upper portion of the inner casing 16 contains a time switch 19 and an electric battery 20 for supplying current to an electric lamp 21 inside the clinometer cage 7. The object of the time switch 19 is to complete a circuit for the lamp 21 for a fixed period of time which occurs after an interval of time estimated to be necessary for lowering the instrument to the bottom of the bore hole. The current to the lamp 21 is supplied from the battery 20 by means of a central metal pivot 22 and an insulated metal ring 23 on the clinometer cage engaging a contact brush 24, as will be explained more fully in the next paragraph. The clinometer cage is pivoted at its lower end by a bearing 25.

The arrangements for suplying electric current to the lamp 21 from battery 20 are shown in more detail on an enlarged scale in Figure IIa. The outer shell of battery 20, which forms the negative pole, is connected to the casing 16 by means of a spring 20a which is rigidly secured to the casing 16. The central electrode of battery 20, which forms the positive pole, engages a metal centre piece 20b. The metal centre piece 20b co-operates with an insulated spring pivot arm 22 which is engaged on the face opposite the pivot by the central electrode of the lamp 21. The lamp 21 screws into a socket formed in an insulating disc 21a which is provided with a metal ring 23 arranged to contact with the cap of lamp 21. Electrical connection is established from ring 23 to the casing 16 by means of a contact brush 24 attached to the free end of a spring 24a which has its other end secured to the casing 16.

The clinometer cage is provided at one side with a wedge-shaped mass or bias weight 26 of heavy material so that when the surveying instrument is inclined from the vertical the clinometer cage will rotate about pivots 22 and 25 until the wedge 26 gravitates to its lowest position. Diametrically opposite to the wedge 26 is a pendulum 27 pivoted at 28 so as to allow the pendulum 27 to swing freely in a plane including the centre of gravity of the wedge 26 and the axis of the cage. Consequently when the instrument is inclined from the vertical the clinometer cage 7 will rotate until the pendulum 27 assumes its maximum deflection. The pendulum 27 is then hanging vertically and its deflection with respect to the axis of the clinometer cage is equal to the inclination of the instrument and consequently of the axis of the bore hole. The lower end of pendulum 27 is provided with a pointer 29 arranged at right angles to the pendulum and so arranged with relation to a curved and suitably graduated scale 30 that its ends point to a graduation numbered with the angle of inclination of the bore hole. This scale which is shown more clearly in Figure II, is provided with a centre line passing through the axis of the cylindrical clinometer cage. It will be appreciated that the direction of this line in a horizontal plane will vary depending upon the bearing with respect to the magnetic north of the plane into which the instrument is inclined, and in fact will accord with the direction of this plane. Consequently the clinometer apparatus in addition to assuming a state characteristic of the inclination of the bore hole viz. the particular position of the pointer 29 with respect to the scale 30, also assumes a state characteristic of the bearing of the bore hole viz. the particular position of the centre line of the scale 30 with respect to the magnetic north.

Underneath the clinometer cage there is provided a compass card 31 which is arranged in gymbals secured to the inner casing 16. Due to the pin 17 and groove 18, the compass card 31 is held in fixed relationship with the marking device 9, since a vertical plane passing through the plane of movement of the marking device 9 will always pass through the same diameter of the compass card 31. For convenience it is arranged that this plane passes through a radial line on the compass card extending from 0° to the centre. Due to the provision however of the gymbals 32, the compass card will always occupy a horizontal plane independently of the inclination and orientation of the surveying instrument. A compass needle 33 is pivoted above the compass card so that it is free to rotate and occupy a north position. The position of this compass needle in conjunction with the position of the centre line of the scale 30 enables the absolute magnitude of the magnetic bearing of the bore hole to be determined.

To determine the absolute deflection and absolute orientation of the bore hole by means of this instrument it is therefore necessary to obtain a record, while the instrument is at the bottom of the bore hole, of the position of the pointer 29 with reference to the scale 30 and the position of the centre line on the scale 30 with reference to the compass needle 33. This is conveniently effected by photographic means and for this purpose the scale 30 and the compass card 31 are made transparent and a piece of light-sensitive paper 34 is inserted in a slot below the compass card. A suitable diaphragm 35 is provided between the lamp 21 and the sensitive paper 34. The light from the lamp 21 casts a shadow of the pointer 29, the graduations on the scale 30, the compass needle 33, and the graduations on the compass card 31, onto the sensitive paper 34. After the instrument has been raised to the surface the sensitive paper is suitably treated to provide a visible and permanent record. The nature of the result obtained is shown in Figure V, in which the image of the pointer 29 is indicated by 29', the image of the scale 30 is indicated by 30', the image of the compass needle 33 is indicated by 33' and the image of the compass card 31 is indicated by 31'.

It will be noted that the degrees on the compass card are marked in an anticlockwise direction and it will be readily understood from the preceding description that the angle indicated by the image 29' of the pointer 29 is the angle of inclination of the bore hole, that the angle between the centre line of the image 30' of the scale 30 and the image 33' of the compass needle 33 is the magnetic bearing of the bore hole; and that the angle indicated by the image 33' of the compass needle 33 is the magnetic bearing of the scratch mark on the surface at the bottom of the bore hole, the scriber 11 being fixed at a point corresponding to the zero mark on card 31. Thus in the example shown the inclination of the bore hole is about 15°, the magnetic bearing of the bore hole is about 105° east of magnetic north and the magnetic bearing of the scratch mark is about 240° east of magnetic north, i. e. 120° west of magnetic north.

Figures III and IV show a modified arrangement dispensing with the clinometer cage in which the pendulum device instead consists of a bob 36 suspended from a pivot 37 (which is attached directly to the inner shell 16) by means of a thread 38 so that when the instrument is vertical the bob hangs immediately over the centre of the compass card. This construction is particularly suitable for lowering by means of drill rods as the absence of the pivoted clinometer cage avoids the risk of the clinometer being rendered inoperative due to sudden shocks caused to the pivots by the weight of the drill rods. Furthermore in this modification the bias weight 26 is not required and is therefore omitted. The angle of inclination of the bore hole is given by the inclination of the thread 38 to the axis of the clinometer. Instead of making use of the strip scale 30, use is made of concentric graduations provided on the compass card, the image of which is shown in Figure VI. These concentric graduations may be arranged and numbered so that the position of the shadow of the bob 36 on the image of these concentric graduations gives a direct reading of the inclination of the bore hole.

It will be appreciated that all planes passing through the thread 38 in any position of the instrument will be vertical planes and that the particular one of these planes which also passes through the centre of the compass card will be the vertical plane through the axis of the bottom of the bore hole so that a line drawn on the photographic record through the centre of the bob and the centre of the compass scale to the periphery will indicate the same direction as the centre line of the image 30' obtained with the arrangement of Figures I and II. The photographic record shown in Figure VI therefore gives the same data as the photographic record shown in Figure V.

Having thus obtained the inclination and orientation of the bore hole it now remains to extract the marked piece of bore-core and to determine from it the dip and the direction of the strata which it contains. For this purpose the marked piece of bore-core is set into a position which is exactly parallel in all respects with that which it occupied when in position in the earth. To accomplish this, use is made of the goniometric device shown in Figure VII. The piece of bore-core 39 is clamped in a holder 40 with its scratched end 39' uppermost. The holder 40 is attached to a horizontal spindle 42 mounted in an upright standard 43 so as to be rotatable about its own axis. The standard 43 is secured to one end of a horizontal arm 44 which is free to rotate about the centre of a circular graduated scale 45 and may be clamped in any desired position by means of a thumbscrew 46. The scale 45 is marked on a plane baseboard 47 provided with levels 48 and levelling screws 49.

In order to facilitate the use of the goniometric device it is advisable to set the baseboard 47 so that the zero mark on the scale 45 points approximately to the magnetic north. The baseboard is then levelled by the levelling screws 49. When the baseboard has been thus levelled, the holder 40 is rotated about its axis until a pointer 50 fixed to the horizontal spindle 42 and moving over a graduated arc 51 indicates that the bore-core 39 has the same inclination that it had when in the earth. The holder is then clamped by tightening the thumbscrew 52. The horizontal arm 44 is then moved around the scale 45 until a cut-back edge 44' which is radial to the centre of the scale 45 is against the degree mark corresponding to the magnetic bearing of the bore-hole deflection.

The top of the standard 43 is made hollow to receive an extension piece 53 which is free to rotate about the vertical axis of the standard 43 and to be clamped in any desired position by the thumb-screw 54. The top of the extension piece 53 is provided with a vertical slot 55 arranged to receive one end of a bar 56 which is pivoted to the extension piece 53 by a horizontal pivot 53' and is thus free to rotate in a vertical plane and to be held in any desired position by a tight frictional coupling with the slot 55. A further bar 57 is pivoted to the other end of the bar 56 in a friction-tight manner by a horizontal pivot 57' so as to turn in a vertical plane and has pivoted at its other end with a triangular-shaped plate 58 which is capable of being clamped to bar 57 by a thumb-screw 63 and has attached to it a transparent plate or visor 59 provided with a line 60 running along its centre at right angles to the plane of movement of the bar 56. The transparent plate 59 is attached at right angles to the plate 58. A pendulum pointer 61 hangs freely from a hub 64 in front of a degrees scale 62 which is rigidly secured to the plate 58 and is so graduated that when the plate 59 is in a horizontal plane the pendulum 61 indicates the 0° mark on the scale 62. The line 60 on the visor 59 is now brought parallel to the ascertained magnetic bearing of the scratch mark 41 by loosening thumbscrews 54 and 63, viewing down through line 60 and rotating the assembly at extension piece 53 until line 60 coincides with the angle on baseboard scale 45 corresponding to the magnetic bearing of the scratch mark 41 as obtained from the photographic record.

Thumbscrew 54 is now clamped; and by adjusting the position of 56, 57 and 58, the visor is brought immediately above the clamped piece of core 39. Viewing down through line 60 or the parallel edge of the visor 59, the core 39 is then rotated in the holder (the position of the holder remaining unchanged) until the line 60 or the parallel edge of the visor 59 coincides with the mark 41 on the upper flat surface of the core 39. The core 39 is now in a position which corresponds in all respects with that which it occupied when in situ in the earth and is substantially parallel thereto.

Thumbscrew 54 is now loosened and the position of the visor plate 59 is adjusted until it is parallel to the plane of a selected stratum revealed in the core 39. The dip of the stratum is then read off from the position of the pendulum pointer 61 with respect to scale 62, whilst the strike of the stratum is read off from the angle indicated on the scale 45 when so viewed through the visor 59 that the engraved line 60 passes through the centre of the scale 45.

I claim:

1. A bore-hole surveying instrument including two separate devices arranged to take up positions depending upon the inclination and magnetic bearing of the axis of the lower end of the bore hole respectively, means for recording said positions, and means for marking a radial line on a substantially transverse surface at the lower end of the bore hole.

2. A bore-hole surveying instrument including two separate devices arranged to take up positions depending upon the inclination and magnetic bearing of the axis of the lower end of the bore hole respectively, means for recording said positions, and a marking device having a fixed relationship to said recording means and arranged to mark a radial line on a substantially transverse surface at the bottom of the bore hole.

3. A bore-hole surveying instrument including two separate devices arranged to take up positions depending upon the inclination and magnetic bearing of the axis of the lower end of the bore hole respectively, photographic means for recording said positions, and means for making a radial scratch line across a substantially transverse surface at the bottom of the bore hole in a manner bearing a known relationship to the photographic records.

4. A bore-hole surveying instrument including a compass scale arranged to occupy a horizontal plane for varying positions of the instrument, an inclination indicator arranged to hang vertically over the compass scale for varying positions of the instrument, a compass needle moving over said scale, photographic means for recording the position of the inclination indicating means and the compass needle, and a resiliently yielding finger for making a radial scratch line across a substantially transverse surface at the bottom of the bore hole in a manner bearing a known relationship to the photographic records.

5. A bore-hole surveying instrument including a transparent compass scale arranged to assume a horizontal plane for varying positions of the instrument, an inclination indicator arranged to hang vertically over the compass scale for varying positions of the instrument, a source of light above the scale for forming a shadow of the inclination indicating means on said scale, a compass needle moving over said scale, light sensitive paper under said scale for making a record of the position of said shadow and said needle, and a resiliently yielding finger for making a scratch line across a substantially transverse surface at the lower end of the bore hole in a manner bearing a known relationship to said record.

6. A bore-hole surveying instrument including a light sensitive plane surface arranged to assume a horizontal plane for varying positions of the instrument, an inclination indicator arranged to swing in a single plane and assume a vertical position for varying positions of the instrument, a magnetic device arranged to assume a north position for varying positions of the instrument, means for lighting said surface in accordance with the positions occupied by said inclination indicator and said magnetic device, and a resiliently yielding finger having a fixed relationship to the plane of the inclination indicator and arranged to make a scratch line across a substantially transverse surface at the lower end of the bore hole.

7. A bore-hole surveying instrument including a compass card arranged to assume a horizontal plane for varying positions of the instrument, an inclination indicator arranged to assume a vertical position for varying positions of the instrument, a compass needle arranged to rotate over said compass card to assume a north position for varying positions of the instrument, and a resiliently yielding finger for making a scratch line across a substantially transverse surface at the lower end of the bore hole to indicate a direction corresponding to a selected direction on the compass scale.

8. A bore-hole surveying instrument including a plane surface arranged to assume a horizontal position for varying positions of the instrument, an inclination indicator arranged to assume a vertical position for varying positions of the instrument, a magnetic device arranged to assume a north position for varying positions of the instrument, a source of light for projecting onto the horizontal surface a shadow of the inclination indicator so as to give the direction of the vertical plane passing through the axis of the lower end of the bore hole and also the inclination of said axis to the vertical and for projecting onto the same horizontal surface a shadow of the device indicating the north position, means for making a photographic record of the relative positions of said shadows, and a resiliently yielding finger for making a scratch line across a substantially transverse surface at the lower end of the bore hole in a manner bearing a known relationship to the photographic record.

9. A bore-hole surveying instrument including means for making a radial scratch line on the upper surface of a portion of bore-core in situ, a photographic surface, and means for projecting onto said photographic surface images for enabling the angle of inclination of the lower end of the bore hole, the magnetic bearing of the lower end of the bore hole and the magnetic bearing of said mark to be read off from graduated scales on said photographic surface.

10. A method of surveying bore holes and strata revealed thereby which consists in grinding a substantially transverse surface at the lower end of the bore hole, lowering a bore hole surveying instrument to the lower end of the bore hole, making a record characteristic of the inclination and magnetic bearing of the axis of the lower end of the bore hole by means included in said instrument, making a radial scratch mark on said surface, removing said instrument from the bore hole, drilling the lower end of the bore hole to form a stump of core bearing said scratch mark on its upper surface, and removing said stump of core from the bore hole.

11. A Bore-hole surveying instrument including a marking finger pivoted close to the periphery of the instrument and in operative relationship with a spring close to the axis of the instrument for scratching a radial line on a substantially transverse surface at the bottom of a bore hole when the instrument is raised and lowered from said surface and means for making a record of data which in combination with said radial line determine the inclination and magnetic bearing of the axis of the lower end of the bore hole.

12. A method of surveying bore holes and strata revealed thereby which consists in grinding a substantially transverse surface at the lower end of the bore hole, making a radial scratch mark having an ascertainable magnetic bearing on said surface, and subsequently drilling the lower end of the bore hole to form a stump of core bearing said scratch mark on its upper surface, and removing said stump of core from the bore hole.

FRANK HUMPHREYS.